United States Patent
Smith, Jr. et al.

(10) Patent No.: US 7,344,692 B2
(45) Date of Patent: Mar. 18, 2008

(54) PROCESS FOR REGENERATING SPENT SULFURIC ACID

(75) Inventors: Lawrence A. Smith, Jr., Pasadena, TX (US); Abraham P. Gelbein, Raleigh, NC (US)

(73) Assignee: Catalytic Distillation Technologies, Pasadena, TX (US)

( * ) Notice: Subject to any disclaimer, the term of this patent is extended or adjusted under 35 U.S.C. 154(b) by 128 days.

(21) Appl. No.: 11/300,505

(22) Filed: Dec. 14, 2005

(65) Prior Publication Data
US 2006/0251570 A1 Nov. 9, 2006

Related U.S. Application Data

(60) Provisional application No. 60/677,874, filed on May 5, 2005.

(51) Int. Cl.
*C01B 17/74* (2006.01)
*C01B 17/90* (2006.01)

(52) U.S. Cl. ............. 423/522; 423/525; 423/526; 423/528; 423/529; 423/531

(58) Field of Classification Search ........... 423/522, 423/525, 526, 528, 529, 531
See application file for complete search history.

(56) References Cited

U.S. PATENT DOCUMENTS

| | | | |
|---|---|---|---|
| 2,091,917 A | 8/1937 | Fenske et al. | |
| 2,472,578 A | 6/1949 | Ferris et al. | |
| 3,013,093 A | 12/1961 | Stiles | |
| 3,496,996 A | 2/1970 | Osdor | |
| 3,759,318 A | 9/1973 | Putney et al. | |
| 3,839,487 A | 10/1974 | Clonts | |
| 3,907,979 A | 9/1975 | Jenniges | |
| 4,053,573 A * | 10/1977 | Harrer et al. | 423/540 |
| 4,075,258 A | 2/1978 | Caulk et al. | |
| 4,376,107 A * | 3/1983 | Morgenthaler | 423/531 |
| 5,114,699 A * | 5/1992 | Wiewiorowski et al. | 423/531 |
| 5,220,095 A | 6/1993 | Hommeltoft et al. | |
| 5,420,093 A | 5/1995 | Joly et al. | |
| 5,444,175 A | 8/1995 | Joly et al. | |
| 5,501,847 A * | 3/1996 | Joly et al. | 423/531 |
| 5,547,655 A * | 8/1996 | Chou et al. | 423/531 |
| 5,785,933 A | 7/1998 | Cunningham et al. | |

* cited by examiner

*Primary Examiner*—Timothy C. Vanoy
(74) *Attorney, Agent, or Firm*—Osha Liang, L.L.P.

(57) ABSTRACT

A process for the regeneration of sulfuric acid contaminated with hydrocarbons and water to produce pure concentration acid comprising: contacting sulfuric acid contaminated with hydrocarbons and water with oxygen and elemental sulfur in the presence of a vanadium containing catalyst in a reaction zone, maintaining at least a portion of the acid in the liquid phase, converting hydrocarbon to carbon oxides and water, and converting sulfur and sulfurdioxide to sulfurtrioxide, separating the reactor effluent into a vapor stream and a liquid stream and cooling and partially condensing of the vapor stream to concentrate clean acid.

14 Claims, 1 Drawing Sheet

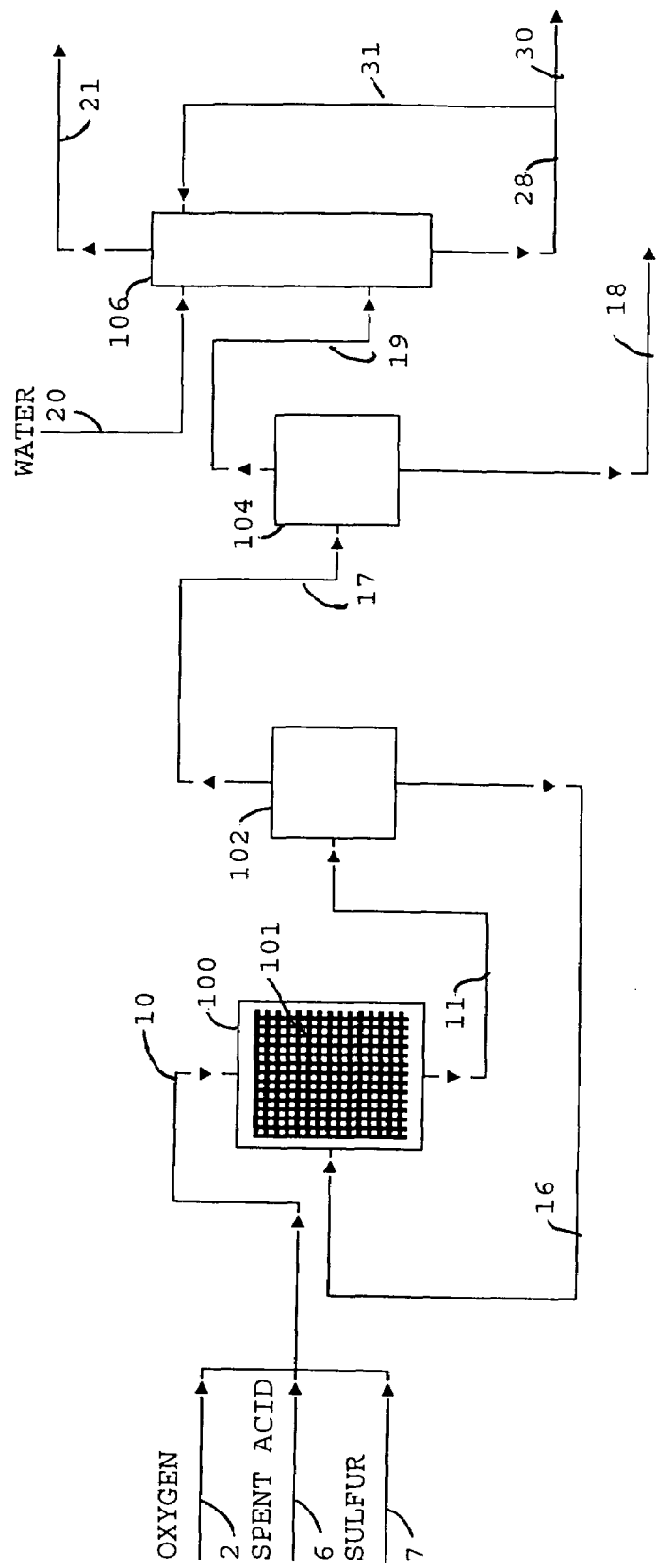

PROCESS FOR REGENERATING SPENT SULFURIC ACID

This application claims the benefit of provisional application 60/677,874 filed May 5, 2005.

BACKGROUND OF THE INVENTION

1. Field of the Invention

The present invention relates to a process for the regeneration of sulfuric acid containing hydrocarbons and water, such as sulfuric acid from a process wherein normal olefins are reacted with isoalkanes in the presence of sulfuric acid to produce alkylate product, to produce fresh sulfuric acid.

2. Related Information

In the petroleum refining industry, acid catalyzed alkylation of aliphatic hydrocarbons with olefinic hydrocarbons is a well known process. Alkylation is the reaction of a paraffin, usually isoparaffins, with an olefin in the presence of a strong acid which produces paraffins of higher octane number than the starting materials and which boil in the range of gasolines. In petroleum refining the reaction is generally the reaction of a $C_2$ to $C_5$ olefin with isobutane.

In refining alkylations, hydrofluoric or sulfuric acid catalysts are most widely used under low temperature conditions. Low temperature or cold acid processes are favored because side reactions are minimized. In the traditional process the reaction is carried out in a reactor where the hydrocarbon reactants are dispersed into a continuous acid phase.

Although this process has not been environmentally friendly and is hazardous to operate, no other process has been as efficient and it continues to be the major method of alkylation for octane enhancement throughout the world. In view of the fact that the cold acid process will continue to be the process of choice, various proposals have been made to improve and enhance the reaction and to some extent moderate the undesirable effects.

In the alkylation process the sulfuric acid catalyst becomes diluted with hydrocarbons and water which produces a sludge which must be disposed of. Typically the sludge is burned in a high temperature combustion zone to convert the acid to sulfur dioxide and the hydrocarbons to carbon oxides and water. The sulfur dioxide is then separated from the other combustion products and converted to sulfur trioxide in a vapor phase reaction over a vanadium-based catalyst. The sulfur trioxide is then converted to concentrated sulfuric by reaction with water in and absorber. One such process is disclosed in U.S. Pat. No. 3,907,979.

In a typical refinery or chemical application low cost spent acid disposal is not an option because of environmental regulations. Generally, the amount of spent acid produced is not sufficient to justify installation of an onsite conventional acid regeneration facility. The alternative is to ship the spent acid to a large scale sulfuric acid plant serving multiple spent acid generators and to receive pure acid in exchange. This alternative is not particularly attractive when compared to the cost of fresh acid.

It is an advantage of the present invention is that it provides an economically acceptable method for the onsite regeneration of spent sulfuric acid. It is another advantage that the present process provides an environmentally acceptable method for the onsite regeneration of spent sulfuric acid.

SUMMARY OF THE INVENTION

Briefly the present invention is a process for the regeneration of sulfuric acid contaminated with hydrocarbons and water to produce pure concentration acid comprising (1) contacting sulfuric acid contaminated with hydrocarbons and water with oxygen and preferably elemental sulfur in the presence of a vanadium containing catalyst in a reaction zone(2) maintaining at least a portion of the acid in the liquid phase, (3) converting hydrocarbon to carbon oxides and water, and converting sulfur and sulfur dioxide to sulfur trioxide, (4) recovering a liquid/vapor effluent from said reaction zone, (5) separating said effluent into a vapor stream and a liquid stream and (6) cooling and partially condensing the vapor stream to concentrate clean acid. Cooling and partial condensation of the vapor stream produces concentrated clean acid and a vent stream containing the carbon oxides and any excess oxygen in the feed. The concentration of the acid depends on the amount of sulfur, if any, added to the reaction zone and the amount of water in the reactor effluent.

BRIEF DESCRIPTION OF THE DRAWING

The FIGURE is a simplified flow diagram in schematic form of one embodiment of the invention.

DETAILED DESCRIPTION OF THE PREFERRED EMBODIMENT

The regeneration is carried out by reaction a liquid/vapor mixture of spent acid, sulfur and oxygen (or an oxygen containing gas) over a supported vanadia catalyst. The operating temperature is in the range of 650-750° F. and a total pressure of between 1 and two atmospheres. Residence time in the reactor and oxygen partial pressure is sufficient to ensure essentially complete conversion of the hydrocarbon contained in the spent acid to carbon oxides and the conversion of sulfur to sulfur trioxide. In the indicated temperature range and in the presence of excess oxygen virtually no sulfur dioxide is present at equilibrium. As used herein the term "excess of oxygen" is understood to mean an amount of oxygen necessary to react with the hydrocarbons, elemental sulfur and/or sulfur dioxide present in the reaction zone to convert all of said hydrocarbons and elemental sulfur and sulfur dioxide to carbon oxides and sulfur trioxide, respectively. For illustrative purposes the hydrocarbon is assumed to be a $C_{20}$ paraffin.

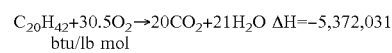
$$C_{20}H_{42} + 30.5O_2 \rightarrow 20CO_2 + 21H_2O \quad \Delta H = -5,372,031 \text{ btu/lb mol}$$

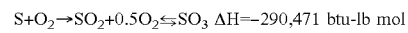
$$S + O_2 \rightarrow SO_2 + 0.5O_2 \leftrightharpoons SO_3 \quad \Delta H = -290,471 \text{ btu-lb mol}$$

Phase equilibrium in the reactor and downstream separation units with respect to acid and water is governed by the following ionic equilibria while oxygen and $CO_2$ are treated as Henry Law components.

$$H_2SO_4 + H_2O \leftrightharpoons H_3O^+ + HSO_4^-$$

$$HSO_4^- + H_2O \leftrightharpoons H_3O^+ + SO_4^=$$

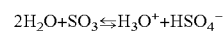
$$2H_2O + SO_3 \leftrightharpoons H_3O^+ + HSO_4^-$$

The reactor is a vertically disposed vessel containing the fixed bed catalyst such as $V_2O_5/K_2SO_4$ supported on silica which is known to catalyze the $SO_2$ to $SO_3$ reaction.

Referring now to the FIGURE a more detailed description of the process is given with a material balance included in the TABLE. The stream numbers match those given in the FIGURE.

Oxygen in stream 3, spent acid in stream 6 and molten sulfur in stream 7 are combined in feed stream 10 and fed to the reactor 100 which contains the fixed bed of catalyst 101 where the hydrocarbons are converted to carbon oxides and the sulfuric acid and sulfur are converted to sulfur trioxide. The feed stream 10 is combined with hot recycle acid in stream 16 at the top of the reactor 100. In a preferred mode of operation the reactor operates adiabatically with the outlet temperature controlled by the temperature and flow rate of the recycle acid. The effluent in stream 11 is phase separated in the reactor V/L separation drum 102 with the liquid phase being recycled to the top of the reactor via stream 16. In a preferred mode of operation the recycle acid mass velocity is in the pulse flow region to ensure good liquid/vapor mass transfer rates.

Pulse flow is obtained at high gas and liquid flow rates. The pulses are characterized by large mass and heat transfer rates. Increased catalyst wetting and a continuous mixing between parallel flowing rivulets diminish flow maldistribution. In addition, the formation of local hot spots is reduced, leading to an intrinsically safer process and diminished catalyst deactivation. The pulses continuously mobilize the stagnant liquid holdup to the point where its stagnant nature disappears. Since stagnant holdup represents about 10 to 30 percent of the total liquid holdup in trickle flow operations, its more dynamic character during pulsing flow enhances reactor performance. Axial dispersion is considerably less compared to trickle flow, due to effective radial mixing between the different parallel flowing liquid streams and disappearance of stagnant liquid hold up. Especially undesired consecutive reactions are reduced to lower levels due to better overall plug flow behavior. A further advantage of pulsing flow is much higher radial conductivity. In some cases, depending on the pulse frequency, significant changes in both yield and selectivity occur.

The main benefit with pulse regime reactor operation is that of increased mass transfer and heat transfer due to the associated turbulence produced. When the catalyst physical characteristics are optimized and the reaction kinetics are not limiting, increasing mass transfer is a key to increasing the process performance.

The vapor from the reactor V/L separator drum 102 is taken as stream 17 and cooled and condensed before being passed to acid product V/L separator drum 104. During the cooling and condensation process $SO_3$ and water combine to form sulfuric acid which is removed as stream 18. The concentration of sulfuric acid in the final product stream 18 is dependent upon the amount of sulfur added to the reactor feed together with flow rate and composition of the spent acid stream.

Stream 19 from the acid product V/L separator drum 104 contains the carbon oxides produced in the the reactor 100 together with any excess oxygen and trace amounts of sulfur oxides. The sulfur oxides are removed by countercurrent washing in absorber 106 with 96% sulfuric acid in recycle stream 31 taken from the liquid product stream 28, and a requisite amount of water from stream 20. Slip stream 30 is the net amount of 96% sulfuric acid produced in the tail gas washing step.

As shown the carbon oxides and excess oxygen are simply vented to the atmosphere in stream 21. An alternative is to separate the oxygen from the carbon oxides, e.g., using a hot carbonate wash, and recycling the recovered oxygen via a compressor to the reactor.

In a preferred mode of operation the stream 2 oxygen feed rate is in excess of that required by the reaction stoichiometry. The excess oxygen also controls the V/L split in the reactor V/L separator drum 102. In another preferred mode of operation the oxygen rate is adjusted such that the net acid product is recovered in stream 17.

TABLE

|  | 2 | 6 | 7 | 10 | 11 | 16 | 17 | 18 |
|---|---|---|---|---|---|---|---|---|
| Temperature F. | 100 | 100.1 | 400.1 | 675 | 680 | 575 | 150 | 150 |
| Pressure psi | 20 | 20 | 20 | 20 | 15 | 30 | 15 | 15 |
| Vapor Frac | 1 | 0 | 0 | 0.858 | 0.229 | 0 | 0.43 | 0 |
| Mass Flow lb/hr |  |  |  |  |  |  |  |  |
| H2O | 0 | 375.078 | 0 | 375.078 | 1036.23 | 32.252 | 0 | 0 |
| H2SO4 | 0 | 11249.95 | 0 | 11249.95 | 99474.46 | 85455.88 | 19139.64 | 19139.6 |
| H3O+ | 0 | 0 | 0 | 0 | 4507.331 | 4489.33 | 0.054 | 0.054 |
| HSO4− | 0 | 0 | 0 | 0 | 22998.63 | 22906.78 | 0.275 | 0.276 |
| SO4-2 | 0 | 0 | 0 | 0 | 1.057 | 1.053 | 0 | 0 |
| S03 | 0 | 0 | 0 | 0 | 4823.575 | 206.178 | 155.534 | 56.72 |
| O2 | 10000 | 0 | 0 | 10000 | 2810.642 | 1.513 | 2809.123 | 9.775 |
| CO2 | 0 | 0 | 0 | 0 | 2732.773 | 7.019 | 2725.727 | 71.287 |
| N-EIC-01 | 0 | 875 | 0 | 875 | 0 | 0 | 0 | 0 |
| SULFUR | 0 | 0 | 2784.868 | 2784.868 | 0 | 0 | 0 | 0 |
| SODIUM | 0 | 0 | 0 | 0 | 0 | 0 | 0 | 0 |
| NA2SO4 | 0 | 0 | 0 | 0 | 0 | 0 | 0 | 0 |
| NA2CO3 | 0 | 0 | 0 | 0 | 0 | 0 | 0 | 0 |
| NAOH | 0 | 0 | 0 | 0 | 0 | 0 | 0 | 0 |
| NA+ | 0 | 0 | 0 | 0 | 0 | 0 | 0 | 0 |
| OH− | 0 | 0 | 0 | 0 | 0 | 0 | 0 | 0 |
| HCO3− | 0 | 0 | 0 | 0 | 0 | 0 | 0 | 0 |
| CO3− | 0 | 0 | 0 | 0 | 0 | 0 | 0 | 0 |

|  | 19 | 20 | 21 | 28 | 30 | 31 |
|---|---|---|---|---|---|---|
| Temperature F. | 150 | 105 | 109.45694 | 122.31196 | 138.5 | 105 |
| Pressure psi | 20 | 20 | 15 | 20 | 30 | 17 |
| Vapor Frac | 0.999999 | 0 | 1 | 0 | 0 | 0 |
| Mass Flow lb/hr |  |  |  |  |  |  |
| H2O | 2.65E−08 | 27.27333 | 8.30E−05 | 4351.4711 | 6241.661 | 4324.196 |
| H2SO4 | 0.033793 | 0 | 0.0040234 | 4.7391485 | 0.034 | 4.709379 |
| H3O+ | 0 | 0 | 0 | 0 | 0 | 0 |
| HSO4− | 0 | 0 | 0 | 0 | 0 | 0 |
| SO4-2 | 0 | 0 | 0 | 0 | 0 | 0 |
| S03 | 98.81541 | 0 | 0.0003195 | 15766.046 | 0 | 15667.23 |
| O2 | 2799.349 | 0 | 2799.3474 | 0.1887371 | 0.046 | 0.187555 |

TABLE-continued

|  |  |  |  |  |  |  |
|---|---|---|---|---|---|---|
| CO2 | 2654.446 | 0 | 2654.4224 | 3.697035 | 1.034 | 3.6739 |
| N-EIC-01 | 0 | 0 | 0 | 0 | 0 | 0 |
| SULFUR | 0 | 0 | 0 | 0 | 0 | 0 |
| SODIUM | 0 | 0 | 0 | 0 | 0 | 0 |
| NA2SO4 | 0 | 0 | 0 | 0 | 0 | 0 |
| NA2CO3 | 0 | 0 | 0 | 0 | 0 | 0 |
| NAOH | 0 | 0 | 0 | 0 | 0 | 0 |
| NA+ | 0 | 0 | 0 | 0 | 2298.978 | 0 |
| OH– | 0 | 0 | 0 | 0 | 0.009 | 0 |
| HCO3– | 0 | 0 | 0 | 0 | 1389.751 | 0 |
| CO3– | 0 | 0 | 0 | 0 | 2317.17 | 0 |

The invention claimed is:

1. A process for the regeneration of sulfuric acid contaminated with hydrocarbons and water to produce pure concentration acid comprising:
   contacting a mixture of sulfuric acid contaminated with hydrocarbons and water, sulfur, and oxygen in the presence of a vanadium containing catalyst in a reaction zone under conditions of temperature and pressure for,
   maintaining at least a portion of the acid in the liquid phase,
   converting hydrocarbon to carbon oxides and water, and converting sulfur to sulfur trioxide,
   recovering a liquid/vapor effluent from said reaction zone,
   separating said effluent into a vapor stream and a liquid stream; and
   cooling and partially condensing the vapor stream to concentrate clean acid.

2. The process according to claim 1 wherein said temperature is in the range of 650-750° F.

3. The process according to claim 1 wherein said pressure is between 1 and two atmospheres.

4. The process according to claim 1 wherein a residence time in the reactor and oxygen partial pressure are sufficient to ensure essentially complete conversion of the hydrocarbon contained in the spent acid to carbon oxides and the conversion of sulfur to sulfur trioxide is maintained.

5. The process according to claim 1 wherein an excess of oxygen is present in said reaction zone.

6. A process for the regeneration of spent sulfuric acid from a sulfuric acid catalyzed alkylation process comprising the steps of:
   (a) feeding sulfur, oxygen, sulfuric acid, hydrocarbons and water to a reactor containing a supported vanadium catalyst;
   (b) concurrently in said reactor;
      (i) reacting sulfuric acid and elemental sulfur with oxygen to produce sulfur trioxide and
      (ii) reacting hydrocarbon with oxygen to produce carbon oxides
   (c) phase separating the effluent from the reactor into a liquid phase and a vapor phase containing water, sulfur trioxide and carbon oxides;
   (d) cooling the vapor phase from the effluent to condense water and produce sulfuric acid; and
   (e) separating the sulfuric acid from the uncondensed vapors containing unreacted oxygen, carbon oxides and sulfur trioxide.

7. The process according to claim 6 wherein the liquid phase from the reactor effluent is recycled to the reactor.

8. The process according to claim 6 wherein the uncondensed vapors from step (e) are washed with water and sulfuric acid to remove sulfur trioxide.

9. The process according to claim 8 wherein the washed vapors containing carbon oxides and oxygen are treated with a carbonate wash to remove the carbon oxides and the oxygen is recycled to the reactor.

10. The process according to claim 6 wherein the oxygen in the oxygen containing stream is in excess of that required by the reaction stoichiometry.

11. The process according to claim 10 wherein the excess oxygen controls the vapor/liquid split in the reactor effluent separation.

12. A process for the regeneration of spent sulfuric acid from a sulfuric acid catalyzed alkylation process comprising the steps of:
   (a) feeding elemental sulfur, a stream containing oxygen and a stream containing sulfuric acid, hydrocarbons and water to a reactor containing a supported vanadia catalyst;
   (b) concurrently in said reactor;
      (i) reacting sulfuric acid with oxygen to produce sulfur trioxide,
      (ii) reacting elemental sulfur with oxygen to produce sulfur trioxide, and
      (iii) reacting hydrocarbon with oxygen to produce carbon oxides;
   (c) phase separating the effluent from the reactor into a liquid phase and a vapor phase containing water, sulfur trioxide and carbon oxides;
   (d) recycling the liquid phase to the reactor;
   (e) cooling the vapor phase from the effluent to condense water and produce sulfuric acid;
   (f) separating the sulfuric acid from the uncondensed vapors containing unreacted oxygen, carbon oxides and sulfur trioxide;
   (g) washing the uncondensed vapors with water and sulfuric acid to remove sulfur trioxide;
   (h) treating the washed vapors containing carbon oxides and oxygen with a carbonate wash to remove the carbon oxides; and
   (i) recycling the oxygen from the treated washed vapors to the reactor.

13. The process according to claim 12 wherein the oxygen in the oxygen containing stream is in excess of that required by the reaction stoichiometry.

14. The process according to claim 13 wherein the excess oxygen controls the vapor/liquid split in the reactor effluent separation.

* * * * *